//<br>United States Patent Office 3,430,544
Patented Mar. 4, 1969

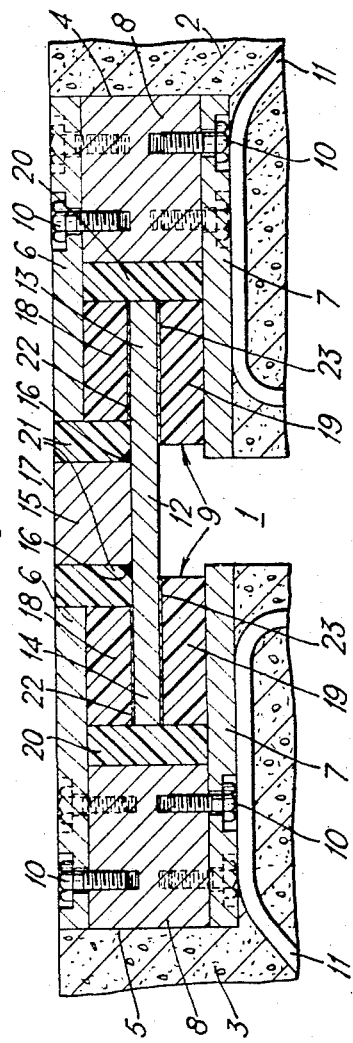
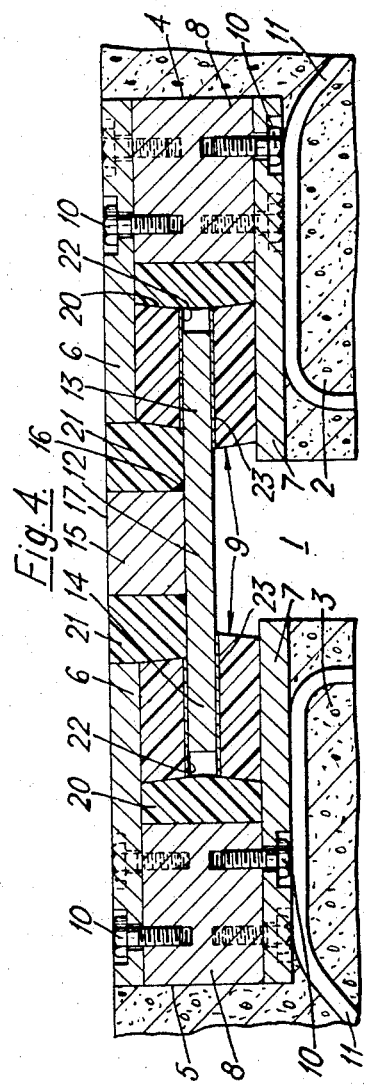

3,430,544
DEVICES FOR SEALING EXPANSION JOINTS IN BRIDGE DECKING
Colin John Berks, London, England, assignor to Expandite Limited, London, England, a British company
Filed Nov. 25, 1966, Ser. No. 596,885
Claims priority, application Great Britain, Dec. 6, 1965, 51,675/65
U.S. Cl. 94—18                                                6 Claims
Int. Cl. E01c *11/10;* E01d *19/06*

ABSTRACT OF THE DISCLOSURE

A device for sealing expansion joints primarily in bridge decking comprises a pair of housings fixed to the decking one on each side of the joint, each housing having in it an open-sided recess with the open sides of the recesses in the two housings directed towards each other. A plate extends across the joint to seal it and has its two opposite side edges held one in each of the recesses, the side edges being sandwiched between layers of rubber or rubber-like material which are held compressed in the recesses to grip the plate and prevent the ingress of dirt or moisture. Movement of the joint is absorbed by distortions of the layers of rubber or rubber-like material, by sliding of the edges of the plate between the layers of rubber or rubber-like material or by both these occurrences.

---

Figure 1:
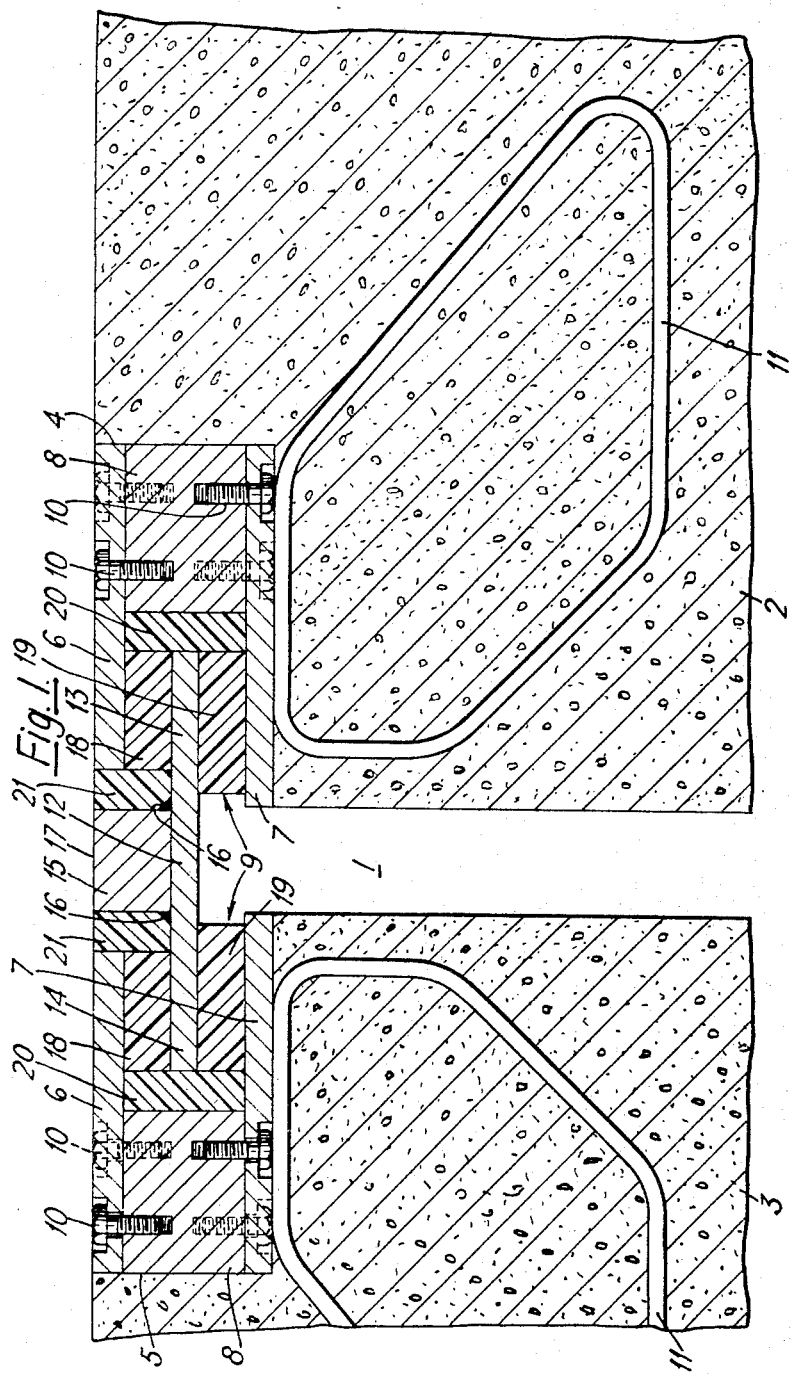

The problem of sealing expansion joints extending across the decking of bridges, especially road bridges, where only small thermal movements take place opening and closing the joint has been successfully overcome in recent years for using flexible sealants. These are not however satisfactory for use in joints in structures where the movement is considerable because all sealants tend to be extruded to some extend when compressed and if the compression is excessive, owing to a large joint movement, the sealant will not quite return to its initial state when the joint opens again. The problem is particularly aggravated in joints in road bridge decking because the impact of traffic quickly destroys the extruded material which is proud of the road surface or brakes its adhesion to the sides of the joint.

With larger structures in general, and in particular larger spans in road bridges, which are becoming more common, the maximum movement which may be encountered is frequently in excess of that which can practically be accommodated with a flexible sealant.

According to this invention, a device for sealing an expansion joint in bridge decking or in other structures where there is substantial thermal movement comprises a pair of housings which are arranged to be fixed to the decking or other structure, one extending along each side of the joint, and each of which has an open-sided recess extending along it, and a plate which is arranged to extend along and across the joint and has one edge held in each recess, each edge being sandwiched between two layers of rubber-like compressible and resilient material which are held compressed in the recesses.

With this arrangement, the dimensions of the device, and in particular the thicknesses of the two layers of rubber or like material may be such that the whole of the movement of the housings towards or away from each other as the joint closes and opens is absorbed by distortion of the rubber or like material. However, particularly where movements of a substantial magnitude take place, the initial part of these movements is absorbed by distortion of the rubber or other material and further movement results in sliding of the plate on the surfaces between which it is sandwiched. When a device is constructed to absorb movements of a magnitude which will bring about sliding movement, layers of a material having a low co-efficient of friction with steel, for example polytetrafluorethylene, are preferably interposed between the layers of rubber or like material and the plate. The polytetrafluorethylene or other low friction material may be laminated to the surface of the layers of rubber or like material, to the surfaces of the plate, or to a combination of or to all these surfaces so that two surfaces of polytetrafluorethylene bear against each other and the frictional drag is reduced as far as possible. If all the surfaces are covered with a layer of polytetrafluorethylene, the resistance to sliding is so slight that only a very small distortion of the compressed layers of rubber or like material takes place before sliding occurs.

Preferably the plate is T-shaped and has its two arms held in the recesses and its leg extending upwards with its end surface flush with the upper surfaces of the housings. The spaces between the side faces of the leg and the edges of the housing are then preferably filled by strips of compressed foamed neoprene or like easily compressible material. These strips are compressed before insertion in the spaces so that they continue to fill the spaces as the joint opens and the spaces increase in width. The main purpose of these strips is to prevent the ingress of grit which might damage the load bearing layers of rubber or like material between which the arms of the T-shaped plate are sandwiched.

Preferably also further strips of compressed foamed neoprene or like easily compressible material are interposed between the ends of the arms of the T and the bases of the recesses. As the joint closes and the two housings move towards each other, these strips of material are compressed as also are the strips interposed between the side faces of the leg of the T and the top edges of the housings.

Figure 2:
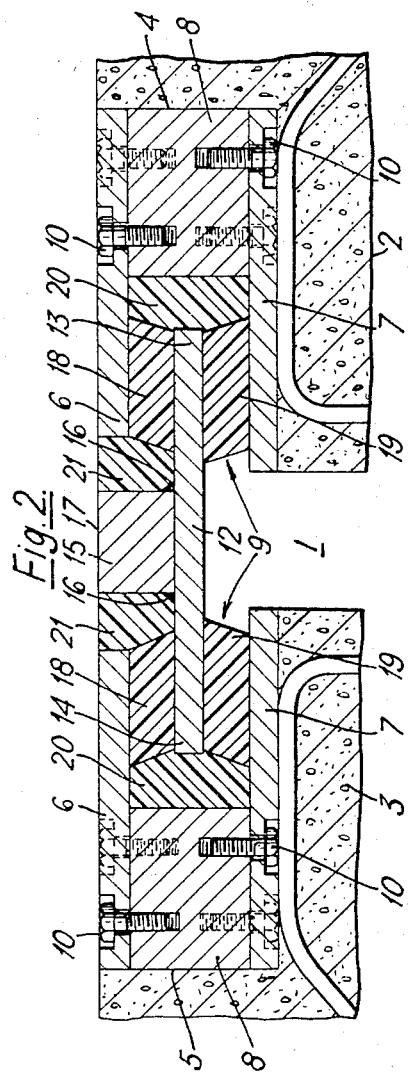

Two examples of devices constructed in accordance with the invention are illustrated in the accompanying drawings in which:

FIGURE 1 is a cross section through the first example in position in a joint which is partly closed;
FIGURE 2 is a cross section similar to FIGURE 1, but showing the joint opened;
FIGURE 3 is a cross section through the second example in position in a joint which is partially closed; and,
FIGURE 4 is a cross section similar to FIGURE 3, but showing the joint opened.

In both the examples, the devices are shown in use sealing an expansion joint 1 between concrete slabs 2 and 3 forming part of a road bridge decking. The sealing device itself is constructed in sections which are placed together end to end to extend along the full length of the joint 1. The device comprises a pair of similar housings 4 and 5 each formed by two flat elongated rectangular plates 6 and 7 which are arranged face to face with a space between them. Between the plates 6 and 7 is a spacer bar 8 which occupies only part of the width of the space between the plates 6 and 7 so that a recess 9 remains. The plates 6 and 7 are fixed together by bolts 10 in rows, the bolts in each row being staggered from those in the row directly above or below. The bolts 10 extend through holes in the plates 6 and 7 and are screwed into tapped holes in the bar 8.

The housings 4 and 5 are anchored in the concrete slabs 2 and 3 respectively by a number of bars 11 in the form of closed loops. The bars 11 are spaced apart at intervals along the plates 7 and are welded to these plates. The housings 4 and 5 with the bars 11 are set in position before the concrete in the slabs 2 and 3 is cast and the concrete is subsequently cast around the bars 11 to hold them in position. If the device is to be used to seal an expansion joint in bridge decking or some other structure made of steel, the plates 7 may have screw threaded studs welded to them in place of the bars 11 and they are then fixed to the strucure by means of the studs and nuts screwed onto them.

A T-shaped plate 12 has arms 13 and 14 held one in each of the recesses 9 and a leg 15 which is fixed to the arms 13 and 14 by welds 16. The upper surface 17 of the leg 15 is flush with the top faces of the plates 6.

In the example shown in FIGURES 1 and 2, the arms 13 and 14 of the plate 12 are sandwiched between layers 18 and 19 of neoprene which are held compressed in a vertical direction in the recesses 9. The layers 18 are compressed between the plates 6 and the plate 12 and the layers 19 are compressed between the plates 7 and the plate 12. The layers 18 and 19 are compressed by removing the bolts 10 fixing the plates 6 to the bars 8, placing the layers of neoprene 18 and 19 and the plate 12 in position with the layers 18 and 19 in an uncompressed state and then placing the plates 6 over the layers 18 and inserting the bolts 10 and tightening them until the layers 18 and 19 are compressed into the position shown in the drawings.

Strips of foamed neoprene 20 are interposed between the bars 8, which form the bases of the recesses 9 and the end edges of the arms 13 and 14. Further strips of foamed neoprene 21 are interposed between the side faces of the leg 15 and the edges of the plates 6 forming the tops of the housings 4 and 5. The foamed neoprene strips 20 and 21 are very much softer and more compressible than the neoprene layers 18 and 19 and consequently they are more easily compressed and have a greater expansion as the joint 1 opens.

The joint 1 is shown in FIGURE 1 partially closed and if the slabs 2 and 3 contract owing to a fall in temperature the joint will open into the position shown in FIGURE 2. The opening of the joint 1 causes the housings 4 and 5 to move away from each other and this causes the arms 13 and 14 of the plate 12 to be withdrawn to some extent from the recesses 9. During this withdrawal movement, the surfaces of the arms 13 and 14 do not slide on the layers 18 and 19, but merely cause these layers to be distorted as is shown in FIGURE 2. At the same time the gaps filled by the foamed neoprene strips 20 and 21 are widened and these strips consequently expand and continue to fill the gaps. The recesses 9 therefore remain completely filled and so do the gaps on each side of the leg 15 so that grit is unable to penetrate down to the surfaces of the arms 13 and 14.

If the joint 1 closes beyond the position shown in FIGURE 1 of the drawings, the arms 13 and 14 will be thrust further into the recesses 9 and again the layers 18 and 19 will be distorted, but in opposite directions from those shown in FIGURE 2. The foamed neoprene strips 20 and 21 will be still further compressed.

The example illustrated in FIGURES 3 and 4 of the drawings is generally similar to that illustrated in FIGURES 1 and 2 except that the neoprene layers 18 and 19 have thin layers 22 and 23 of polytetrafluorethylene laminated to their top and bottom surfaces. The coefficients of friction between the layers 22 and 23 is very much lower than the coefficient of the friction between these faces and the faces of the neoprene layers 18 and 19 in the first example.

In consequence, when the joint 1 opens from the partially closed position shown in FIGURE 3 to the opened position shown in FIGURE 4, the arms 13 and 14 slip on the layers 23 and 24. Of course, a slight distortion of the layers 18 and 19 takes place before slipping occurs. Again the foamed neoprene strips 20 and 21 expand, but the strips 20 are unable to expand to fill spaces between the layers 23 and 24 vacated by the edges of the arms 13 and 14 and in consequence small gaps occur here. These gaps are however entirely sealed and no grit or other extraneous matter can enter them.

I claim:
1. A device for sealing an expansion joint in bridge decking and other structures, said device comprising a pair of housings, means for fixing said housings to said structure one on each side of said joint, wall portions of each of said housings defining an elongated open sided recess, said recesses having the open sides thereof directed towards each other, two layers of compressed resilient rubber-like material in each of said recesses, an elongated strip-like plate means arranged to extend along and across said joint, said plate means being of T-shaped cross-section and comprising two arms and an upwardly extending leg, said arms being located one in each of said recesses and held between said layers in sandwich-like relation, upper surfaces on said housing, and an end surface on said leg coplanar with said upper surfaces on said housings.

2. A device as claimed in claim 1, wherein side faces of said leg and edge faces of said housings define spaces between them, and said device further comprises strips of compressed foamed easily compressible rubber-like material filling said spaces.

3. A device as claimed in claim 2, wherein end faces of said arms and base surfaces of said recesses define further spaces between them and said device further comprises strips of compressed foamed easily compressible rubber-like material in said further spaces.

4. A device as claimed in claim 1, wherein each of said housings comprises a pair of flat elongated rectangular plates arranged face to face and defining a space between them, a spacer bar in said space only partly filling said space and bolts extending through said plates and into said spacer bar to fix said plates and said bar together.

5. A device as claimed in claim 4, further comprising a plurality of bars forming closed loops welded to said housings spaced apart at intervals therealong, said bars enabling said housings to be fixed to concrete decking by casting said bars into said concrete.

6. A device as claimed in claim 1, further comprising layers of polytetraflourethylene interposed between said layers of rubber-like material and said plate.

References Cited

UNITED STATES PATENTS

| | | | |
|---|---|---|---|
| 587,846 | 8/1897 | Moore | 52—397 |
| 1,122,866 | 12/1914 | Cordes | 94—18 |
| 2,286,019 | 6/1942 | Smith | 14—16 |
| 2,416,584 | 2/1947 | Heltzel | 94—18 |
| 3,183,626 | 5/1965 | Schmitt | 94—18 XR |
| 3,344,720 | 10/1967 | Hallock | 14—16 XR |

FOREIGN PATENTS

| | | |
|---|---|---|
| 1,227,609 | 3/1960 | France. |

JACOB L. NACKENOFF, *Primary Examiner.*

U.S. Cl. X.R.

14—16